(12) United States Patent
Wann et al.

(10) Patent No.: US 7,386,734 B2
(45) Date of Patent: Jun. 10, 2008

(54) REAL TIME DATA ENCRYPTION/DECRYPTION SYSTEM AND METHOD FOR IDE/ATA DATA TRANSFER

(75) Inventors: Shuning Wann, Fremont, CA (US); Chih-Chung Shih, Taipei (TW); I-Yao Chuang, Hsintsu (TW); Bor Wen Chiou, Taoyuan (TW)

(73) Assignee: Enova Technology Corporation, Hsin-Chu (TW)

( * ) Notice: Subject to any disclaimer, the term of this patent is extended or adjusted under 35 U.S.C. 154(b) by 675 days.

(21) Appl. No.: 10/635,833

(22) Filed: Aug. 6, 2003

(65) Prior Publication Data
US 2004/0107340 A1 Jun. 3, 2004

Related U.S. Application Data

(63) Continuation-in-part of application No. 09/704,769, filed on Nov. 3, 2000.

(51) Int. Cl.
*G06F 11/30* (2006.01)
*G06F 12/14* (2006.01)
*H04L 9/32* (2006.01)

(52) U.S. Cl. .................... 713/189; 713/193; 726/14; 380/255

(58) Field of Classification Search ............... 713/189, 713/193; 380/28
See application file for complete search history.

(56) References Cited

U.S. PATENT DOCUMENTS

| 5,513,262 | A  | * | 4/1996  | van Rumpt et al. | 380/29 |
| 6,081,895 | A  | * | 6/2000  | Harrison et al.  | 713/189 |
| 6,199,163 | B1 | * | 3/2001  | Dumas et al.     | 713/183 |
| 6,715,004 | B1 | * | 3/2004  | Grimsrud et al.  | 710/35 |
| 2002/0174297 | A1 | * | 11/2002 | McDonald et al.  | 711/114 |
| 2003/0037230 | A1 | * | 2/2003  | Verinsky et al.  | 713/1 |
| 2004/0034768 | A1 | * | 2/2004  | Poldre           | 713/153 |

\* cited by examiner

*Primary Examiner*—Gilberto Barron, Jr.
*Assistant Examiner*—Samson Lemma
(74) *Attorney, Agent, or Firm*—The Patel Law Firm, P.C.; Natu J. Patel

(57) ABSTRACT

A data encryption/decryption system comprising a cryptographic interface operatively coupled between a host device and a data storage device is disclosed. The host and data storage devices include respective IDE controllers supporting full ATA protocol. The cryptographic interface includes a host device-side IDE controller and a data storage device-side IDE controller, each controller supporting partial ATA protocol. The cryptographic interface also includes a cipher engine adapted to transparently perform real time data ciphering during IDE/ATA data transfer between the host and data storage devices in conjunction with the host device-side IDE controller and the data storage device-side IDE controller.

8 Claims, 9 Drawing Sheets

REAL TIME DATA ENCRYPTION/DECRYPTION SYSTEM AND METHOD FOR IDE/ATA DATA TRANSFER

CROSS-REFERENCE TO RELATED APPLICATION

This application is a continuation-in-part of pending U.S. patent application Ser. No. 09/704,769, filed Nov. 3, 2000, entitled "An encryption-decryption device for data storage", the entire disclosure of which is incorporated herein by reference.

FIELD OF THE INVENTION

The present invention relates generally to data encryption/decryption and more particularly to a real time data encryption/decryption system for IDE/ATA data transfer.

BACKGROUND OF THE INVENTION

Integrated Drive Electronics (IDE) is a standard electronic interface used between a computer motherboard bus and disk storage devices. IDE has been adopted as a standard by American National Standards Institute (ANSI), whereby the ANSI designation for IDE is Advanced Technology Attachment (ATA). IDE/ATA also refers to the electronic protocol used by computers or host devices to transfer data to/from data storage devices. There are two data transfer methods used in IDE: Programmed Input/Output (PIO) and Direct Memory Access (DMA). In PIO mode, the data transfer is initiated and performed by the host device or processor. In DMA mode, data transfer is controlled by signals for handshaking between the host device and the data storage device.

When proprietary information is kept in storage media where physical access control cannot be assured, data encryption and decryption provides a mechanism for protecting data from unauthorized access. Data may be cryptographically protected by encrypting data as it is sent from a host device to a data storage device, and decrypting the stored data as it is retrieved from the data storage device upon request by the host device.

In a conventional data relay approach, data is transferred via an IDE bridge or interface placed in series between a host and a data storage device. This type of data transfer traditionally requires that the IDE interface implement an IDE controller supporting full ATA protocol on each side of the IDE interface for data buffering/dataflow control. The IDE interface simultaneously plays the role of a virtual host device with the data storage device and the role of a virtual data storage device with the host device during IDE/ATA data transfer. The problem with the data relay approach is that the IDE interface needs to implement large data buffers to maintain dataflow control. Such large data buffers are often implemented on an IDE application specific integrated circuit (ASIC) using costly static random-access memory (SRAM) macros or the like, which results in high chip manufacturing costs.

SUMMARY OF THE INVENTION

The present invention is generally directed to a data ciphering system comprising at least one cryptographic interface operatively coupled between at least one host device and at least one data storage device, and adapted to perform real time data encryption and decryption during IDE/ATA data transfer between the host device and the data storage device without affecting the overall data transfer efficiency.

In one embodiment of the present invention, a cryptographic interface for IDE/ATA data transfer intervention comprises a first IDE controller supporting partial ATA protocol, and a second IDE controller supporting partial ATA protocol. The second IDE controller is operatively coupled to the first IDE controller. The first and second IDE controllers are adapted to forward IDE/ATA dataflow control signals between at least one host IDE controller of at least one host device and at least one data storage IDE controller of at least one data storage device while data is streaming between the host device and the data storage device during IDE/ATA data transfer. The host IDE controller and the data storage IDE controller each support full ATA protocol.

In another embodiment of the present invention, a cryptographic interface for IDE/ATA data transfer intervention comprises a first IDE controller supporting partial ATA protocol, and a second IDE controller supporting partial ATA protocol. The second IDE controller is operatively coupled to the first IDE controller. The first and second IDE controllers are adapted to delay forwarding of IDE/ATA dataflow control signals between at least one host IDE controller of at least one host device and at least one data storage IDE controller of at least one data storage device if data is not streaming between the host device and the data storage device during IDE/ATA data transfer. The host IDE controller and the data storage IDE controller each support full ATA protocol.

In yet another embodiment of the present invention, a method for ciphering of data during IDE/ATA data transfer between a host device and a data storage device comprises the steps of intercepting at least one IDE/ATA data transfer between the host and data storage devices, forwarding IDE/ATA dataflow control signals between the host and data storage devices while data is streaming between the host and data storage devices, delaying forwarding of the IDE/ATA dataflow control signals between the host and data storage devices if data is not streaming between the host and data storage devices, and performing transparently real time ciphering of data.

These and other aspects of the present invention will become apparent from a review of the accompanying drawings and the following detailed description of the present invention.

BRIEF DESCRIPTION OF THE DRAWINGS

The invention is best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Like numerals denote like features throughout the specification and drawings in which.

DETAILED DESCRIPTION OF THE INVENTION

Some embodiments of the present invention are described in detail with reference to the related drawings of FIGS. 1 through 9. Additional embodiments, features and/or advantages of the invention will become apparent from the ensuing description or may be learned by practicing the invention.

Figure 1:
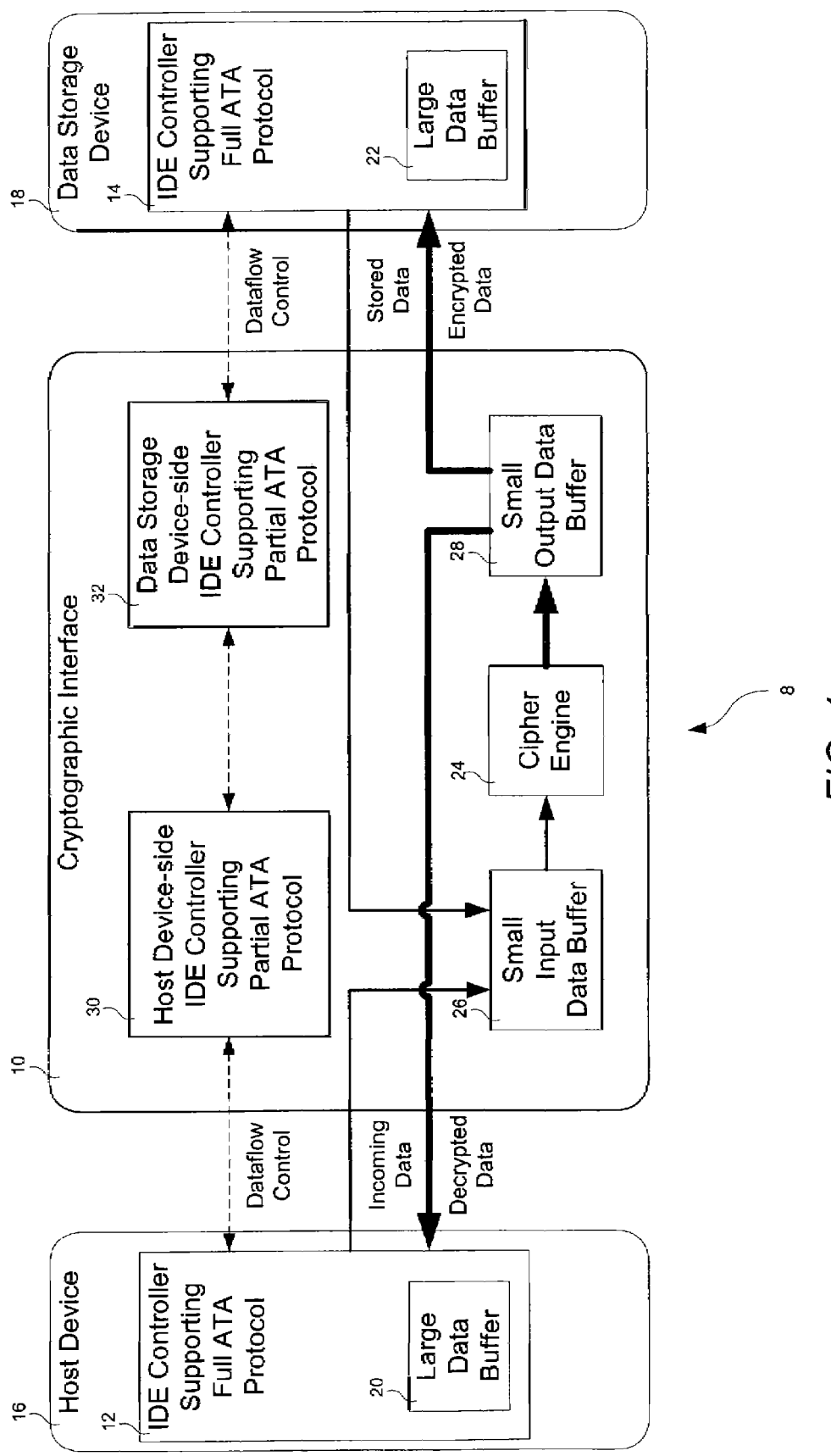
FIG. 1 is a schematic block diagram of a real-time data encryption/decryption system for IDE/ATA data transfer.

FIG. 1 is a schematic block diagram of a real time data encryption/decryption system 8 for IDE/ATA data transfer. Real time data encryption/decryption system 8 comprises a cryptographic interface 10 operatively coupled between an IDE controller 12 of a host device 16 and an IDE controller 14 of a data storage device 18. Cryptographic interface 10 is adapted to perform transparently real-time data encryption/decryption during IDE/ATA data transfer between host device 16 and data storage device 18, without affecting adversely the overall data transfer efficiency.

IDE controller 12 supports standard full-ATA protocol and includes a conventional large data buffer 20 for dataflow control. IDE controller 14 also supports standard full-ATA protocol and includes a conventional large data buffer 22 for dataflow control. In general, host device 16 may be a desktop or notebook computer, microprocessor, router, interface card, or any other device capable of generating data, while data storage device 18 may be a disk drive, tape drive, floppy diskette, compact disk drive, magnetic optical drive, digital video recorder, flash memory card, PCMCIA card, or any other device capable of storing data for retrieval purposes.

In one embodiment of the invention, cryptographic interface 10 is programmed to intercept IDE/ATA data transfers between host device 16 and data storage device 18 and transparently encrypt/decrypt data by way of a cipher engine 24, which is operatively coupled between a small input data buffer 26 and a small output data buffer 28, as generally illustrated in FIG. 1. Cipher engine 24 of cryptographic interface 10 encrypts/decrypts data in several standard pipeline stages using various known cryptographic algorithms such as DES (Data Encryption Standard), TDES (Triple DES), or AES (Advanced Encryption Standard) during IDE/ATA data transfers between host device 16 and data storage device 18. Other types of cipher engines and/or cryptographic algorithms may also be utilized in practicing the invention.

In another embodiment of the invention, cryptographic interface 10 is programmed to directly forward/pass through IDE/ATA dataflow control signals from host device 16 to data storage device 18, and vice versa, by way of a host device-side IDE controller 30, and a data storage device-side IDE controller 32 while data is streaming between host device 16 and data storage device 18. Each of IDE controllers 30, 32 is adapted: to support partial ATA protocol, as generally depicted in FIG. 1. As generally shown in FIG. 1, cryptographic interface 10 forwards IDE/ATA dataflow control signals from host device 16 to data storage device 18 by intercepting host IDE/ATA dataflow control signals by way of host device-side IDE controller 30, and reproducing these control signals for data storage device 18 by way of data storage device-side IDE controller 32.

Similarly, cryptographic interface 10 forwards IDE/ATA dataflow control signals from data storage device 18 to host device 16 by intercepting data storage device IDE/ATA dataflow control signals by way of data storage device-side IDE controller 32, and reproducing these control signals for host device 16 by way of host device-side IDE controller 30. The partial ATA protocol implementation in IDE controllers 30, 32 in conjunction with cipher engine 24 allows cryptographic interface 10 to transparently encrypt/decrypt data in real time during IDE/ATA data transfer between host device 16 and data storage device 18. Cryptographic interface 10 is configured to process data at least as fast as host device 16 and data storage device 18 so as not to impair the overall data transfer efficiency.

In yet another embodiment of the invention, cryptographic interface 10 is programmed to delay the forwarding of IDE/ATA dataflow control signals from host device 16 to data storage device 18, and vice versa, if data is not streaming between host device 16 and data storage device 18, as generally described herein below with reference to steps 148 and 152 of FIG. 7.

From the functional viewpoint of IDE controllers 12, 14, IDE/ATA data transfer is being performed directly between host device 16 and data storage device 18 without any intervention by cryptographic interface 10. Therefore, cryptographic interface 10 does not need to include traditional data buffering/dataflow control capabilities such as large data buffers and full ATA protocol support, as traditionally practiced in the art. Additionally, there is no need to separate IDE/ATA data transfer between host and data storage devices into two independent data transfers, such as between host device 16 and cryptographic interface 10, and between cryptographic interface 10 and data storage device 18. IDE controllers 12, 14 are each responsible for handling data buffering/dataflow control during IDE/ATA data transfer. Cryptographic interface 10 acts generally as a "forwarder" or an IDE/ATA-compliant data flow control signal pass-through bridge between host device 16 and data storage device 18 during IDE/ATA data transfers. IDE controllers 30, 32 of cryptographic interface 10 need only interpret those ATA commands which are required to perform cipher data processing.

As further depicted in FIG. 1, host device 16 may store data in data storage device 18 by way of cryptographic interface 10 which transparently encrypts incoming data in real time via small input data buffer 26, cipher engine 24, and small output data buffer 28. Host device 16 may retrieve stored encrypted data from data storage device 18 by way of cryptographic interface 10 which transparently decrypts the same in real time via small input data buffer 26, cipher engine 24, and small output data buffer 28.

In still another embodiment of the invention, cryptographic interface 10 is implemented as an application-specific integrated circuit (ASIC). Small input data buffer 26 and small output data buffer 28, which are used to hold data for the pipeline stages of cipher engine 24, are implemented using latches or registers. This implementation avoids the use of costly static random access memory (SRAM) macros or the like. Other implementations of cryptographic interface 10 may be utilized, provided such other implementations agree with the intended spirit and scope of the present invention.

Figure 2:
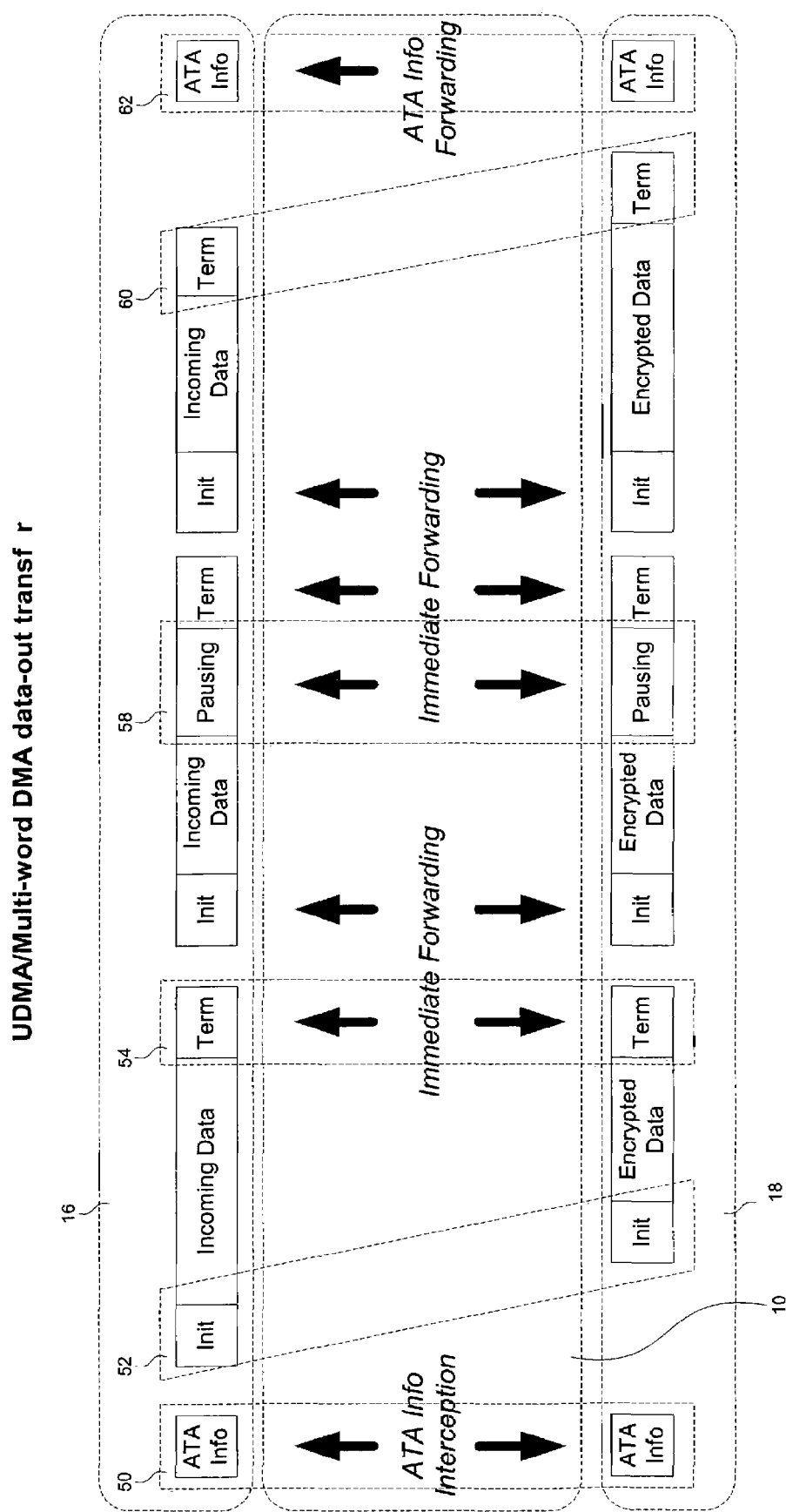
FIG. 2 is a schematic representation of an Ultra Direct Memory Access (UDMA)/Multi-word DMA data-out transfer.

FIG. 2 is a schematic representation of an UDMA/Multi-word DMA data-out transfer. UDMA is a protocol for transferring data between a hard disk drive through a computer bus to the computer's random access memory (RAM). The UDMA protocol transfers data in burst mode and uses cyclical redundancy checking (CRC) for data protection during ATA data transfer. Data burst mode includes data burst initialization, data burst pausing, and data burst termination procedures. In one example, UDMA/Multi-word DMA data-out transfer may be defined as UDMA/Multi-word DMA data transfer from host device 16 to data storage device 18. In another example, UDMA/Multi-word DMA data-out transfer may be defined as UDMA/Multi-word DMA data transfer from data storage device 18 to host device 16.

Before onset of a data burst initialization procedure, cryptographic interface 10 intercepts critical IDE/ATA data transfer parameters such as data transfer mode, data transfer size, and the like, to prepare for UDMA/Multi-word DMA data transfer between host device 16 and data storage device 18 according to these parameters, as schematically shown in step 50 of FIG. 2.

At the beginning of an UDMA/Multi-word DMA data-out transfer, which consists of several data bursts, cryptographic interface 10 performs a burst initialization procedure with host device 16 to initiate the data transfer and direct incoming data to cipher engine 24 (shown in FIG. 1) via small input buffer 26 (shown in FIG. 1). After the incoming data is encrypted and transferred to small output data buffer 28 (shown in FIG. 1), cryptographic interface 10 performs a burst initialization procedure with data storage device 18 and transmits the encrypted data to data storage device 18, as schematically shown in step 52 of FIG. 2.

During transmission of a data burst, if host device 16 or data storage device 18 requires a pause in data transfer due to dataflow control issues, cryptographic interface 10 immediately forwards corresponding data transfer pause command/response signals between host device 16 and data storage device 18 to allow for momentary suspension of data transfer, as schematically shown in step 58 of FIG. 2. Therefore, cryptographic interface 10 is not concerned with dataflow control at all during UDMA/Multi-word DMA data-out transfer. Instead, cryptographic interface 10 transparently intervenes to pass through dataflow control signals and perform data encryption via IDE controller 30 (shown in FIG. 1) and cipher engine 24 (shown in FIG. 1), respectively.

As schematically shown in step 54 of FIG. 2, if host device 16 or data storage device 18 needs to terminate a data burst in transmission, cryptographic interface 10 immediately forwards corresponding data transfer termination command/response signals between host device 16 and data storage device 18 to allow for termination of data transfer.

During the burst termination procedure, IDE controller 12 (shown in FIG. 1) transmits a CRC value calculated from plain text data to IDE controller 30 (shown in FIG. 1) for error checking at the end of each data burst. IDE controller 32 (shown in FIG. 1) of cryptographic interface 10 transmits a CRC value calculated from cipher text data to data storage device 18 for error checking at the end of each data burst. If the transmitted cipher text CRC value is erroneous, data storage device 18 reports the discrepancy to host device 16 by a CRC error status bit upon termination of the data transfer with no additional action being taken by cryptographic interface 10.

If the transmitted plain text CRC value is erroneous, cryptographic interface 10 forwards the CRC error to data storage device 18 to notify data storage device 18 of the same by transmitting a pre-defined erroneous CRC value to data storage device 18 during the final data burst termination procedure. A final data burst termination procedure is generally shown as step 60 in FIG. 2.

As schematically shown in step 62 of FIG. 2, when data transfer is complete, data storage device 18 forwards corresponding ATA information to host device 16 to notify host device 16 of the same.

Figure 3:
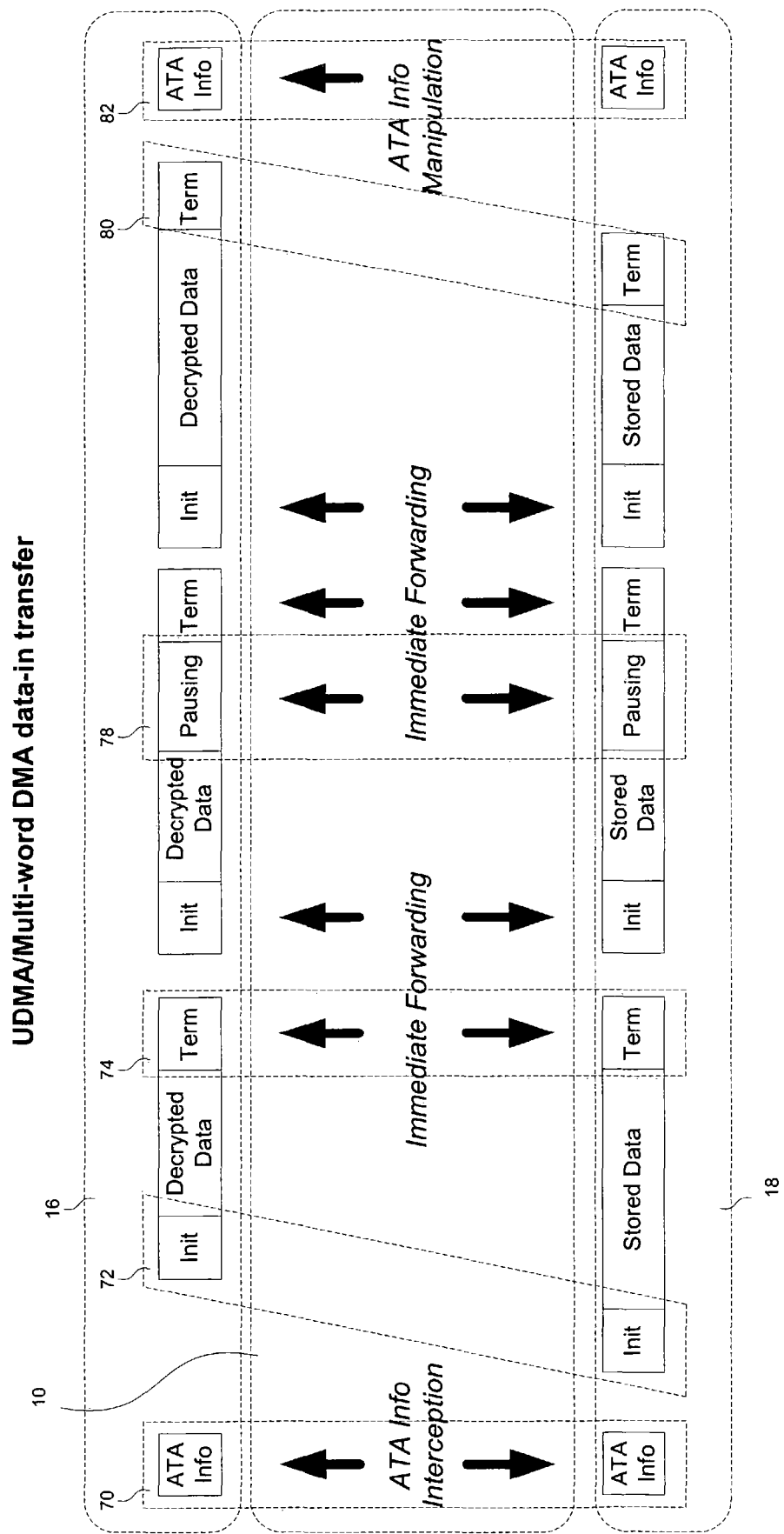
FIG. 3 is a schematic representation of an UDMA/Multi-word DMA data-in transfer.

FIG. 3 is a schematic representation of an UDMA/Multi-word DMA data-in transfer. In one example, UDMA/Multi-word DMA data-in transfer may be defined as UDMA/Multi-word DMA data transfer from data storage device 18 to host device 16. In another example, UDMA/Multi-word DMA data-in transfer may be defined as UDMA/Multi-word DMA data transfer from host device 16 to data storage device 18.

As schematically shown in step 70, cryptographic interface 10 intercepts critical IDE/ATA data transfer parameters such as data transfer mode, data transfer size, and the like to prepare for UDMA/Multi-word DMA data transfer between data storage device 18 and host device 16 according to these parameters. Cryptographic interface 10 performs a burst initialization procedure with data storage device 18 to initiate the data transfer and direct encrypted data to cipher engine 24 (shown in FIG. 1) for decryption via small input buffer 26 (shown in FIG. 1). After the incoming data is decrypted and transferred to small output data buffer 28 (shown in FIG. 1), cryptographic interface 10 performs a burst initialization procedure with host device 16 and transmits the decrypted data to host device 16, as schematically shown in step 72 of FIG. 3.

During transmission of a data burst, if data storage device 18 or host device 16 requires a pause in data transfer due to dataflow control issues, cryptographic interface 10 immediately forwards corresponding data transfer pause command/response signals between data storage device 18 and host device 16 to allow for momentary suspension of data transfer, as schematically shown in step 78 of FIG. 3. Cryptographic interface 10 is, therefore, not concerned with dataflow control at all during UDMA/Multi-word DMA data-in transfer. Instead, cryptographic interface 10 transparently intervenes during UDMA/Multi-word DMA data-in transfer to pass through dataflow control signals and perform data decryption via IDE controller 32 (shown in FIG. 1) and cipher engine 24, respectively.

If data storage device 18 or host device 16 needs to terminate a data burst in transmission, cryptographic interface 10 immediately forwards corresponding data transfer termination command/response signals between data storage device 18 and host device 16 to allow for termination of data transfer, as schematically shown in step 74 of FIG. 3.

In step 80, cryptographic interface 10 performs a final burst termination procedure with data storage device 18. Cipher engine 24 decrypts the last remaining data, and transmits the same to small output data buffer 28. Cryptographic interface 10 performs a burst termination procedure with host device 16. If a CRC error occurs on the data storage device side of the data transfer, no special action is taken by cryptographic interface 10 as data storage device 18 reports the error to host device 16 by a CRC error status bit upon termination of the data transfer.

If a CRC error occurs on the host device side of the data transfer, cryptographic interface 10 does not forward the error to data storage device 18 since the data storage device side data transfer has already terminated. As schematically shown in step 82, to resolve the discrepancy, cryptographic interface 10 manipulates ATA information by asserting the CRC error status bit to "true" to notify host device 16 that a CRC error has been detected by data storage device 18, whereby host device 16 may take corrective action such as to re-transmit the data.

Figure 4:
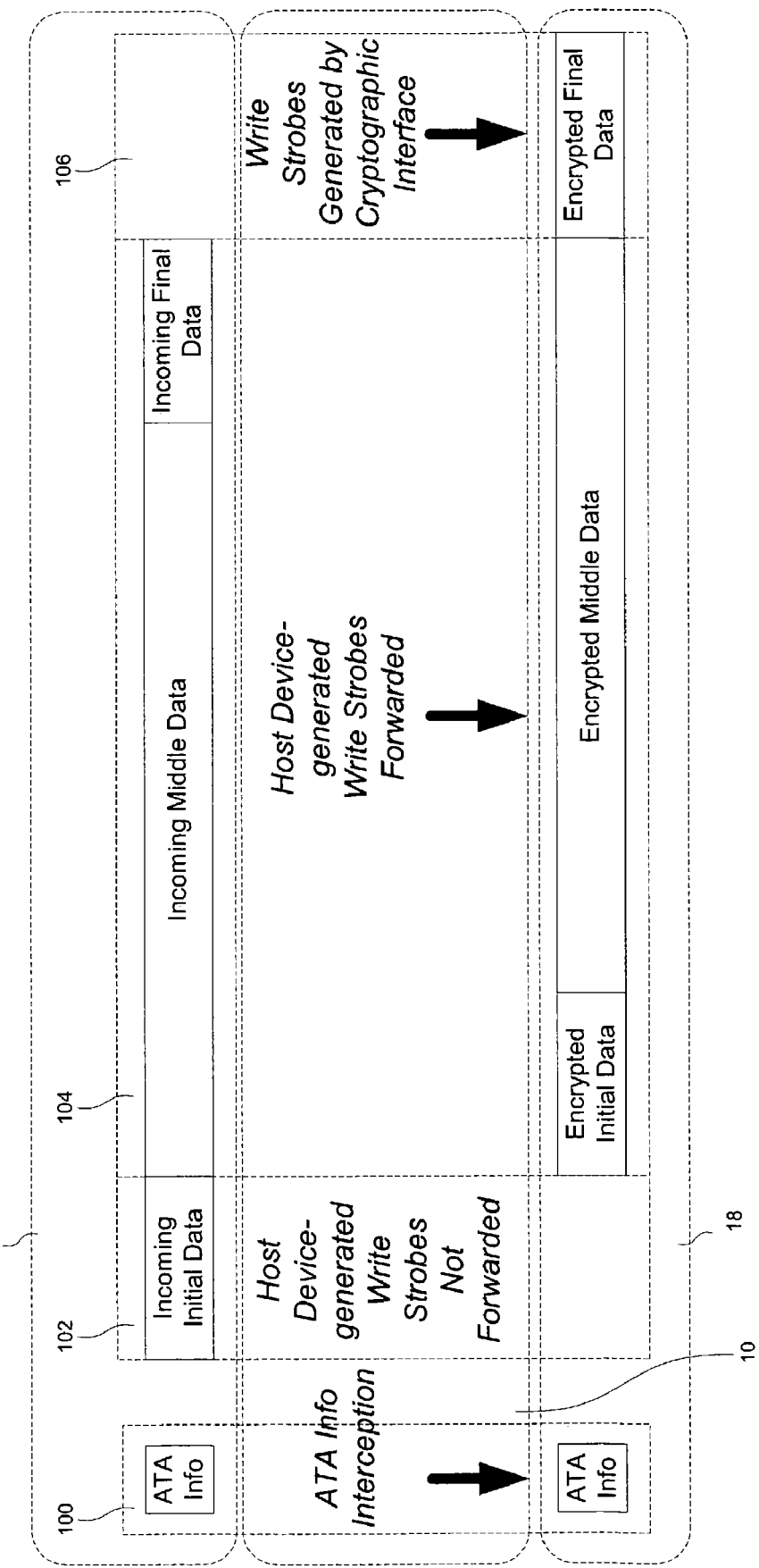
FIG. 4 is a schematic representation of a Programmed Input/Output (PIO) data-out transfer.

FIG. 4 is a schematic representation of a PIO data-out transfer from host device 16 to data storage device 18. In PIO mode, data transfer is initiated and performed by a host device, such as a microprocessor. Dataflow control includes read and write data strobes, which are issued to a data storage device by either a host central processing unit (CPU) or a host ATA adapter. In one example, PIO data-out transfer may be defined as PIO data transfer from host device 16 to data storage device 18. In another example, PIO data-out transfer may be defined as PIO data transfer from data storage device 18 to host device 16.

Initially, cryptographic interface 10 intercepts critical IDE/ATA data transfer parameters such as data transfer mode, data transfer size, and the like, to prepare for PIO data-out transfer between host device 16 and data storage device 18 according to these parameters, as schematically shown in step 100 of FIG. 4. Host device 16 generates write strobes to transmit data to cryptographic interface 10. Cryptographic interface 10 directs the incoming data to cipher engine 24 (shown in FIG. 1) for encryption via small input data buffer 26 (shown in FIG. 1). IDE controller 30 (shown in FIG. 1) of cryptographic interface 10 is programmed to delay forwarding of these write strobes to IDE controller 14 (shown in FIG. 1) of data storage device 18 via IDE controller 32 (shown in FIG. 1) until incoming data has been encrypted and is ready to be transmitted to data storage device 18, as generally shown in step 102 of FIG. 4

As generally depicted in step 104 of FIG. 4, when the encrypted data is ready for transmission to data storage device 18, IDE controller 30 (shown in FIG. 1) of cryptographic interface 10 forwards the write strobes directly to IDE controller 14 (shown in FIG. 1) of data storage device 18 for the remaining duration of the data transfer. Upon completion of the host side data transfer, cryptographic interface 10 immediately generates write strobes and appends the same to the storage device side data transfer, as generally shown in step 106 of FIG. 4.

Figure 5:
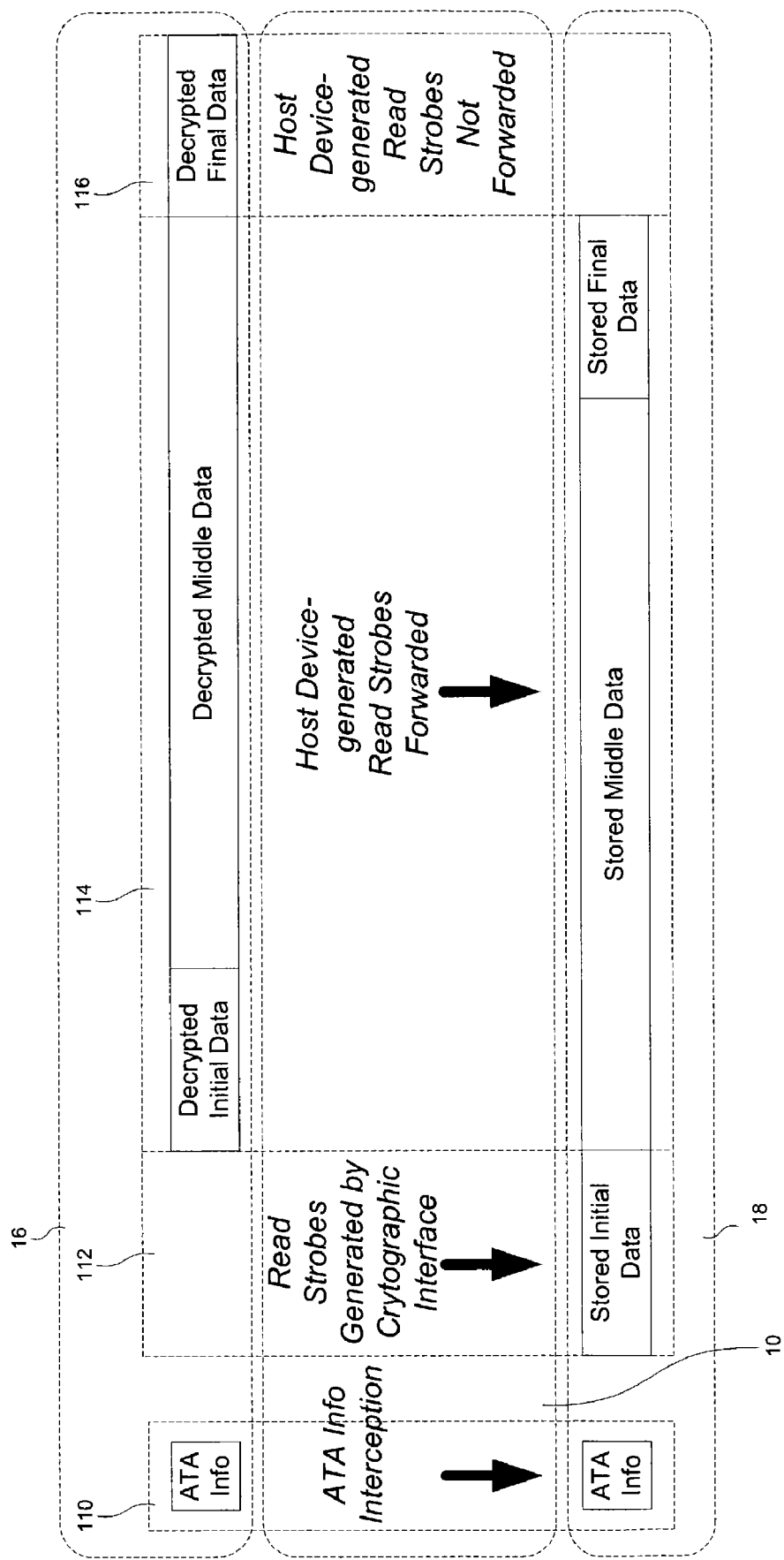
FIG. 5 is a schematic representation of a PIO data-in transfer.

FIG. 5 is a schematic representation of a PIO data-in transfer from data storage device 18 to host device 16. In one example, PIO data-in transfer may be defined as PIO data transfer from data storage device 18 to host device 16. In another example, PIO data-in transfer may be defined as PIO data transfer from host device 16 to data storage device 18.

Initially, cryptographic interface 10 intercepts critical IDE/ATA data transfer parameters such as data transfer mode, data transfer size, and the like, to prepare for PIO data-in transfer between data storage device 18 and host device 16 according to these parameters, as generally shown in step 110 of FIG. 5. Cryptographic interface 10 generates read strobes for IDE controller 32 (shown in FIG. 1) to begin retrieval of data from data storage device 18. Data storage device 18 responds by transmitting encrypted data to cipher engine 24 of cryptographic interface 10 for decryption via small input data buffer 26 (shown in FIG. 1). Cryptographic interface 10 continues to generate read strobes, as generally depicted in step 112 of FIG. 5, until the decrypted data is ready to be transmitted to host device 16 via small output data buffer 28 (shown in FIG. 1).

As generally shown in step 114 of FIG. 5, host device 16 generates read strobes to retrieve decrypted data from cryptographic interface 10. The host device-generated read strobes are forwarded directly to data storage device 18 by way of IDE controller 30 (shown in FIG. 1), IDE controller 32 and IDE controller 14 (shown in FIG. 1) for the remaining duration of the data transfer.

As generally depicted in step 116 of FIG. 5, upon completion of the data storage device side data transfer, IDE controller 30 of cryptographic interface 10 ceases forwarding host device-generated read strobes while host device 16 continues to read the remaining incoming decrypted data from cryptographic interface 10.

The PIO data-in and data-out transfers result in substantially identical data throughput rates on both sides of cryptographic interface 10 thereby avoiding the traditional need for dataflow control support by cryptographic interface 10 due to differences in strobe periods on each side of cryptographic interface 10.

The initial and final portions of the PIO data transfers do not encounter dataflow control problems even though no data strobes are being forwarded in these relatively short portions of data transfer. One reason is because these data transfer portions are relatively short. Another reason is because the data transfer between host device 16 and cryptographic interface 10 alone does not require dataflow control. Data transfer between cryptographic interface 10 and data storage device 18 alone, also, does not require dataflow control. In general, dataflow control may be required by cryptographic interface 10 when there is a difference in the quantity of data transferred on both sides of cryptographic interface 10, but since these relatively short initial/final data transfer portions only occur on either the host device side or the data storage device side, no dataflow control is generally required by cryptographic interface 10.

Figure 6:
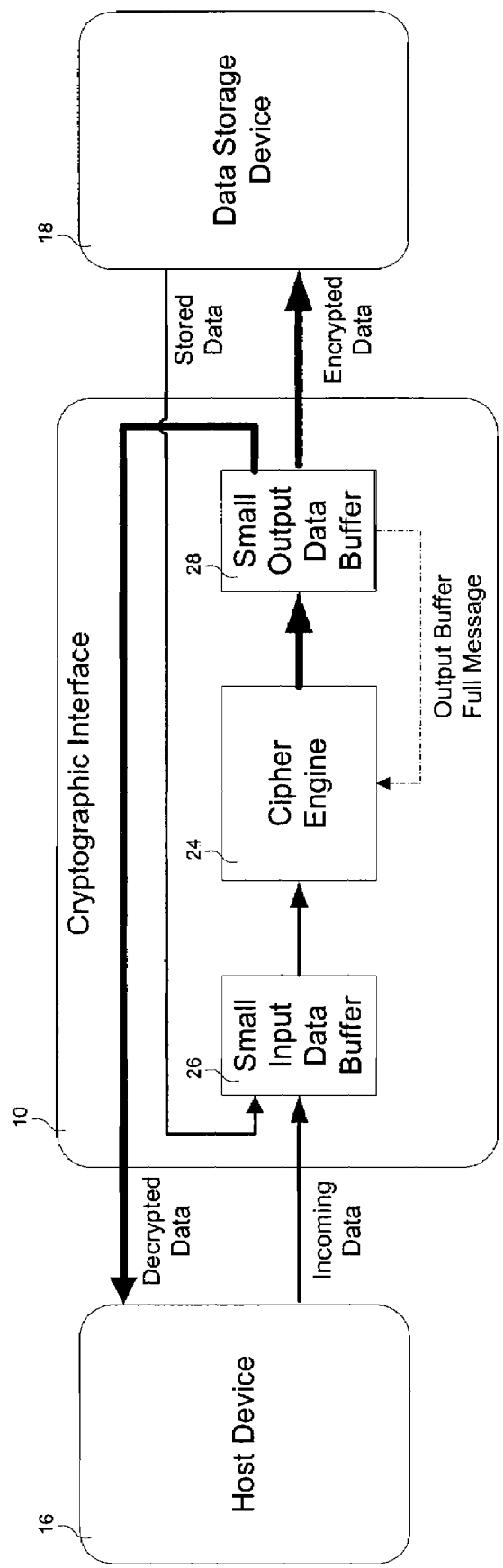
FIG. 6 generally shows one embodiment of the real-time data encryption/decryption system of FIG. 1.

FIG. 6 generally shows one embodiment of real-time data encryption/decryption system 8 of FIG. 1. Specifically, cipher engine 24 of cryptographic interface 10 is programmed to cease data encryption/decryption immediately upon detection of small output data buffer 28 being full, as generally shown by the output buffer full message of FIG. 6. Specifically, all pipeline ciphering stages cease data processing immediately with no data being accepted any more from small input data buffer 26. Any data present in the ciphering pipeline does not advance to succeeding stages any further. The entire ciphering operation appears "frozen" until cipher engine 24 detects that small output data buffer 28 is no longer full. At that point, cipher engine 24 resumes data processing and each ciphering pipeline stage continues operation from where it had previously stopped. A person skilled in the art should recognize that this ciphering setup simplifies circuitry and consequently data processing, as well as reduces manufacturing costs.

Figure 7:
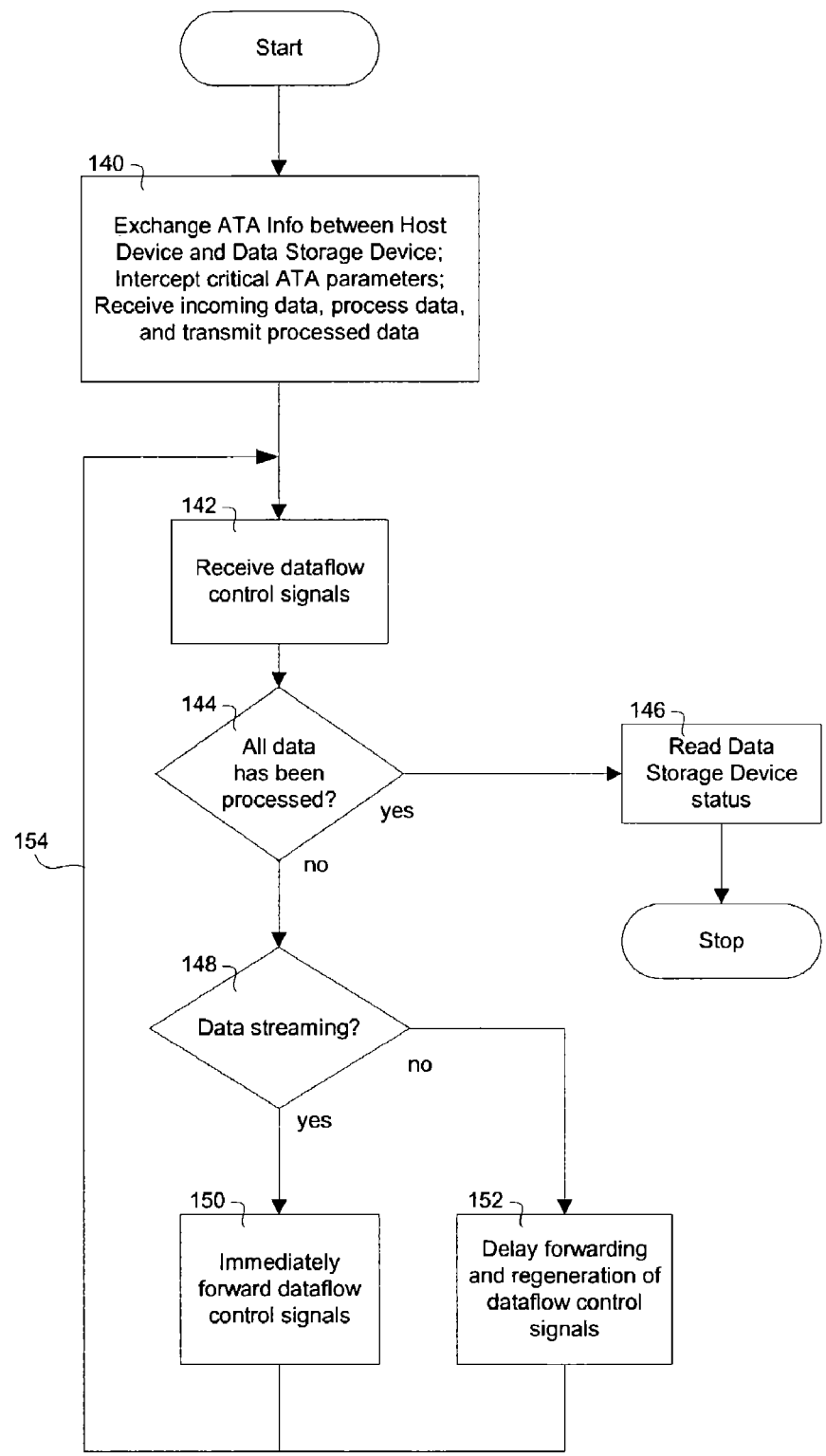
FIG. 7 is a flowchart generally depicting a method for real-time data encryption/decryption during IDE/ATA data transfer.

FIG. 7 is a flowchart generally depicting a method for real-time data encryption/decryption during IDE/ATA data transfer. In step 140 of FIG. 7, ATA information is exchanged between host device 16 and data storage device 18 via cryptographic interface 10 (shown in FIG. 1). Cryptographic interface 10 intercepts critical ATA parameters, receives incoming data, processes data, and transmits processed data to data storage device 18 or to host device 16, respectively. In one example, data processing may refer to data encryption. In another example, data processing may refer to data decryption.

In step 142, cryptographic interface 10 receives dataflow control signals from host device 16 or data storage device 18, respectively. In step 144, cryptographic interface 10 is programmed to determine if all data has been processed. If all data has been processed, host device 16 checks or reads the status of data storage device 18 via IDE controller 12 (shown in FIG. 1), IDE controller 30 (shown in FIG. 1), and IDE controller 32 (shown in FIG. 1), as generally shown in step 146 of FIG. 7, and data transfer stops. If all data has not been processed, cryptographic interface 10 is programmed to determine whether data is streaming between host device 16 and data storage device 18, as generally shown in step 148 of FIG. 7.

In step 150, if data is streaming, cryptographic interface 10 is programmed to immediately forward the received dataflow control signals from host device 16 to data storage device 18, or vice versa. In step 152, if data is not streaming, cryptographic interface 10 is programmed to delay forwarding and regeneration of the received dataflow control signals. The real-time data encryption/decryption cycle continues, as generally shown by directional arrow 154.

Figure 8:
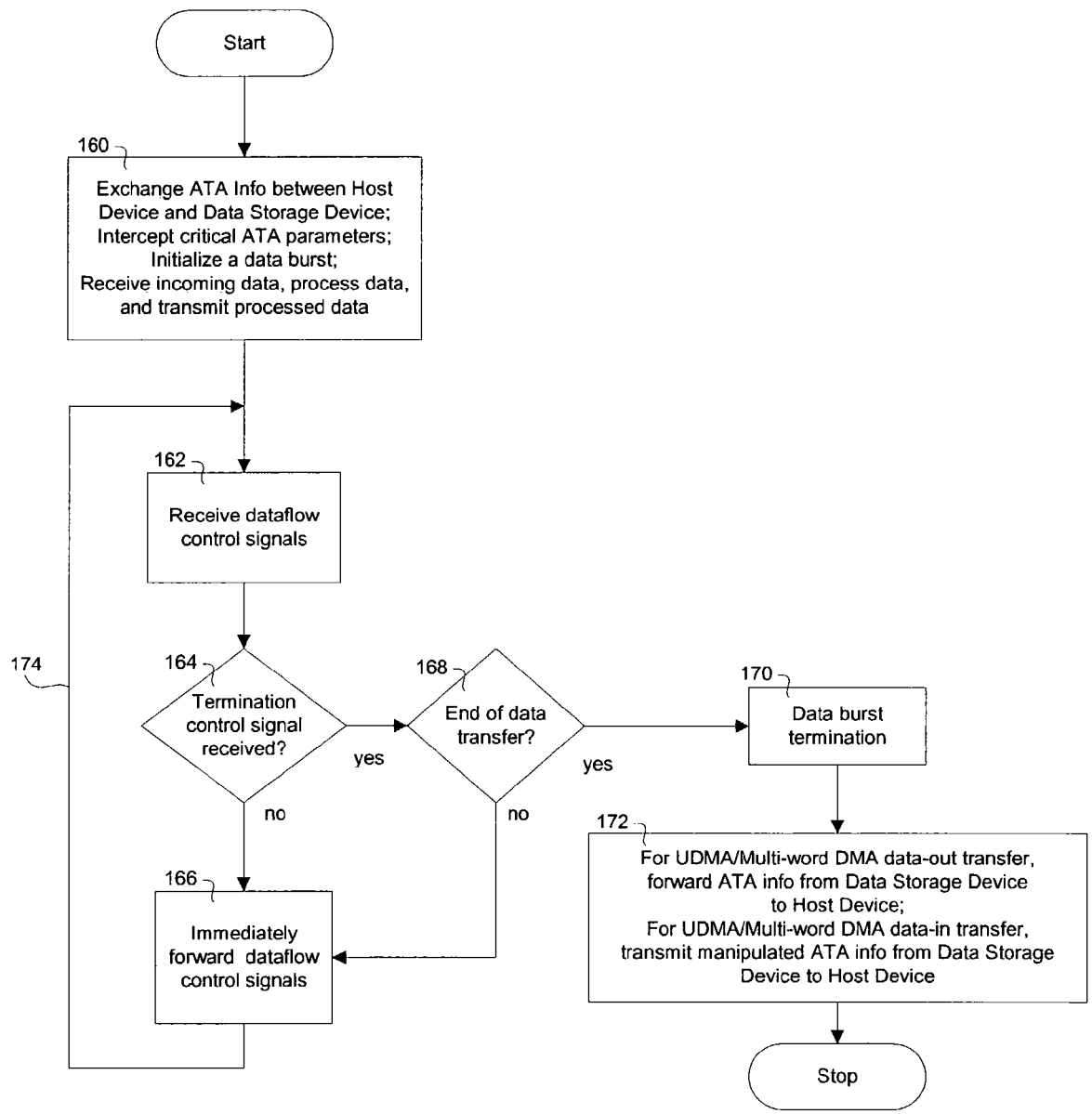
FIG. 8 is a flowchart generally depicting a method for real-time data encryption/decryption during UDMA/Multi-word DMA data transfer.

FIG. 8 is a flowchart generally depicting a method for real-time data encryption/decryption during UDMA/Multi-word DMA data transfer. In step 160, ATA information is exchanged between host device 16 and data storage device 18 via cryptographic interface 10. Cryptographic interface 10 intercepts critical ATA parameters, initializes a data burst with host device 16 (shown in FIG. 1) and data storage device 18 (shown in FIG. 1), receives incoming data, processes data, and transmits processed data to data storage device 18 or to host device 16, respectively. In one example, data processing may refer to data encryption. In another example, data processing may refer to data decryption.

In step 162, cryptographic interface 10 receives dataflow control signals from host device 16 or data storage device 18, respectively. In step 164, cryptographic interface 10 is programmed to determine if a termination control signal has been received from host device 16 or data storage device 18, respectively. If a termination control signal has been received, cryptographic interface 10 is programmed to determine if data transfer has ended, as generally shown in step 168. If data transfer has ended, cryptographic interface 10 performs a data burst termination procedure with host device 16 or data storage device 18, respectively, as generally shown in step 170.

In step 172, in case of UDMA/Multi-word DMA data-out transfer, cryptographic interface 10 is programmed to forward ATA information from data storage device 18 to host device 16, and data transfer stops. In case of UDMA/Multi-word DMA data-in transfer, cryptographic interface 10 is programmed to transmit manipulated ATA information from data storage device 18 to host device 16, and data transfer stops.

If a termination control signal has not been received, cryptographic interface 10 is programmed to immediately forward the received dataflow control signals, as generally shown in step 168 of FIG. 8, from host device 16 to data storage device 18, or from data storage device 18 to host device 16, respectively. Similarly, if data transfer has not ended, cryptographic interface 10 is programmed to immediately forward the received dataflow control signals, as generally shown in step 168 of FIG. 8, from host device 16 to data storage device 18, or from data storage device 18 to host device 16, respectively. The real-time data encryption/decryption cycle continues, as generally shown by directional arrow 174.

Figure 9:
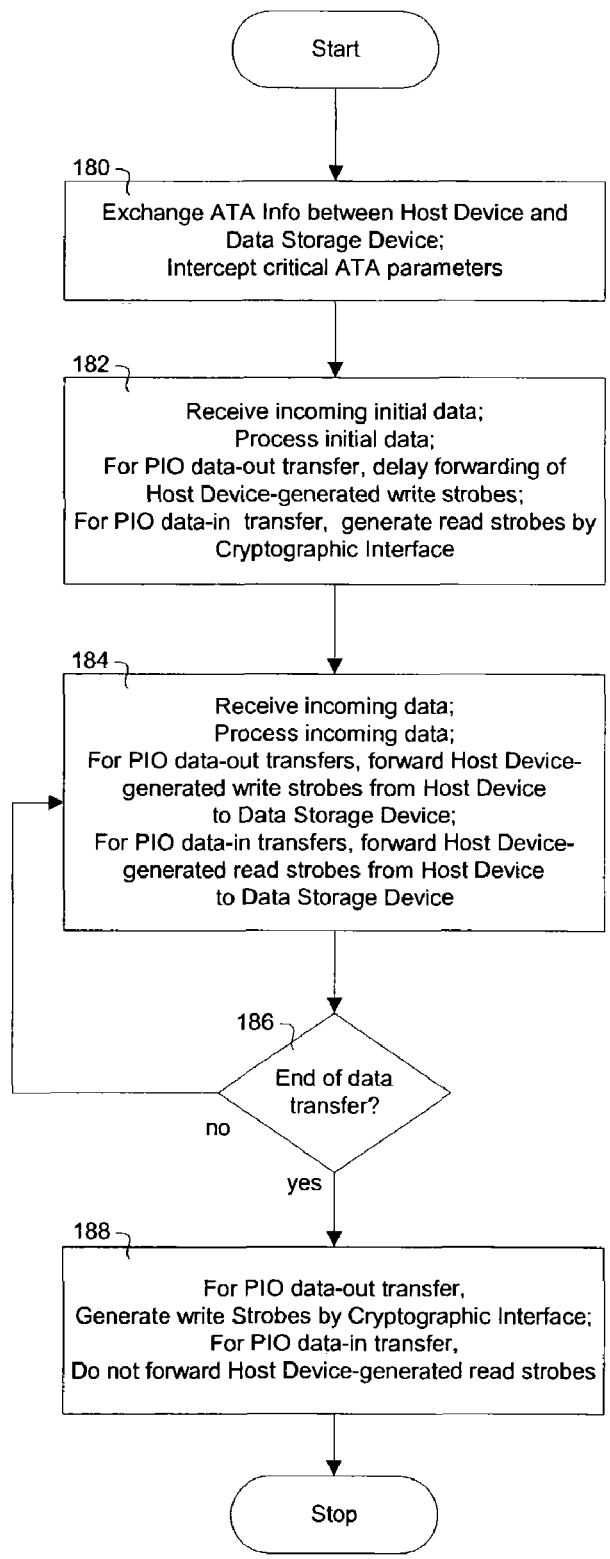
FIG. 9 is a flowchart generally depicting a method for real-time data encryption/decryption during PIO data transfer.

FIG. 9 is a flowchart generally depicting a method for real-time data encryption/decryption during PIO data transfer. In step 180, ATA information is exchanged between host device 16 (shown in FIG. 1) and data storage device 18 (shown in FIG. 1) via cryptographic interface 10 (shown in FIG. 1). Cryptographic interface 10 intercepts critical ATA parameters.

In step 182, cryptographic interface 10 receives incoming initial data and processes the initial data. In case of PIO data-out transfer, cryptographic interface 10 is programmed to delay forwarding of host device-generated write strobes. In case of PIO data-in transfer, cryptographic interface 10 is programmed to generate read strobes.

In step 184, cryptographic interface 10 receives incoming data and processes the incoming data. Furthermore, in case of PIO data-out transfer, cryptographic interface 10 is programmed to forward host device-generated write strobes from host device 16 to data storage device 18. In case of PIO data-in transfer, cryptographic interface 10 is programmed to forward host device-generated read strobes from host device 16 to data storage device 18.

In step 186, cryptographic interface 10 is programmed to determine if data transfer has ended. If data transfer has not ended, the real-time data encryption/decryption cycle continues, as generally shown by directional arrow 190. If data transfer has ended, cryptographic interface 10 is programmed to generate write strobes in case of PIO data-out transfer, as generally shown in step 188, and append the same to the storage device-side data transfer, as described hereinabove in reference to step 106 of FIG. 4, and the data transfer process stops. As further shown in step 188 of FIG. 9, in case of PIO data-in transfer, cryptographic interface 10 is programmed not to forward the host device-generated read strobes, and the data transfer process stops.

While the invention has been described in terms of various specific embodiments, those skilled in the art will recognize that the invention can be practiced with modification within the spirit and scope of the claims. Additionally, features illustrated or described as part of one embodiment can be used in another embodiment to provide yet another embodiment such that the features are not limited to the specific embodiments described above. Thus, it is intended that the present invention cover all such embodiments and variations as long as such embodiments and variations come within the scope of the appended claims and their equivalents.

What is claimed is:

1. A data ciphering system comprising:
    at least one cryptographic interface operatively coupled between at least one host device and at least one data storage device, said at least one cryptographic interface adapted to perform data burst initialization procedure with said at least one host device and said at least one data storage device during Ultra Direct Memory Access (UDMA) data transfer; and said at least one cryptographic interface adapted to perform real time data encryption and decryption during said UDMA data transfer between said at least one host device and said at least one data storage device, where said at least one cryptographic interface is configured to process data at least as fast as said at least one host device and said at least one data storage device so as not to impair the overall data transfer efficiency.

2. A data ciphering system comprising:
    at least one cryptographic interface operatively coupled between at least one host device and at least one data storage device, said at least one cryptographic interface adapted to perform data burst initialization procedure with said at least one host device and said at least one data storage device during Ultra Direct Memory Access (UDMA) data transfer; and said at least one cryptographic interface adapted to perform real time data encryption during said UDMA data transfer between said at least one host device and said at least one data storage device, where said at least one cryptographic interface is configured to process data at least as fast as said at least one host device and said at least one data storage device so as not to impair the overall data transfer efficiency.

3. A data ciphering system comprising:
at least one cryptographic interface operatively coupled between at least one host device and at least one data storage device, said at least one cryptographic interface adapted to perform data burst initialization procedure with said at least one host device and said at least one data storage device during Ultra Direct Memory Access (UDMA) data transfer; and said at least one cryptographic interface adapted to perform real time data decryption during said UDMA data transfer between said at least one host device and said at least one data storage device, where said at least one cryptographic interface is configured to process data at least as fast as said at least one host device and said at least one data storage device so as not to impair the overall data transfer efficiency.

4. A data ciphering system comprising:
at least one cryptographic interface operatively coupled between at least one host device and at least one data storage device, said at least one cryptographic interface adapted to perform data burst initialization procedure with said at least one host device and said at least one data storage device during Ultra Direct Memory Access (UDMA) data transfer; and said at least one cryptographic interface adapted to intercept at least one UDMA data transfer between said at least one host device and said at least one data storage device, and transparently performs real time data cipher processing on said at least one intercepted UDMA data transfer, where said at least one cryptographic interface is configured to process data at least as fast as said at least one host device and said at least one data storage device so as not to impair the overall data transfer efficiency.

5. A data ciphering system, comprising:
at least one host device;
at least one data storage device; and
at least one cryptographic interface operatively coupled between said at least one host device and said at least one data storage device, and adapted to intercept and reproduce IDE/ATA dataflow control signals between said at least one host device and said at least one data storage device during Ultra Direct Memory Access (UDMA) data transfer between said at least one host device and said at least one data storage device, wherein said IDE/ATA dataflow control signals during said UDMA data transfer include data burst initialization, data burst pausing, and data burst termination procedures; said at least one cryptographic interface transparently performs real-time data ciphering processing on at least one intercepted UDMA data transfer; and said at least one cryptographic interface is configured to process data at least as fast as the at least one host device and the at least one data storage device so as not to impair the overall data transfer efficiency.

6. A data ciphering system, comprising:
at least one host device;
at least one data storage device; and
at least one cryptographic interface operatively coupled between said at least one host device and said at least one data storage device, and adapted to delay forwarding of IDE/ATA dataflow control signals between said at least one host device and said at least one data storage device during IDE/ATA PIO data transfer between said at least one host device and said at least one data storage device, wherein said IDE/ATA dataflow control signals during the IDE/ATA PIO data transfer include read data strobes and write data strobes; said at least one cryptographic interface transparently performs real-time data ciphering processing on at least one intercepted IDE/ATA data transfer; and said at least one cryptographic interface is configured to process data at least as fast as the at least one host device and the at least one data storage device so as not to impair the overall data transfer efficiency.

7. A data ciphering system, comprising:
at least one host device;
at least one data storage device; and
at least one cryptographic interface operatively coupled between said at least one host device and said at least one data storage device, and adapted to delay forwarding and generate IDE/ATA dataflow control signals between said at least one host device and said at least one data storage device, wherein said IDE/ATA dataflow control signals during PIO data-out transfer includes write data strobes; said at least one cryptographic interface further comprising at least one cipher engine adapted to transparently perform real time cipher data processing during the PIO data-out transfer between said at least one host device and said at least one data storage device; and said at least one cryptographic interface is configured to process data at least as fast as the at least one host device and the at least one data storage device so as not to impair the overall data transfer efficiency.

8. A data ciphering system, comprising:
at least one host device;
at least one data storage device; and at least one cryptographic interface operatively coupled between said at least one host device and said at least one data storage device, and adapted to generate, forward, and cease forwarding IDE/ATA dataflow control signals between said at least one host device and said at least one data storage device during PIO data-in transfer between said at least one host device and said at least one data storage device, wherein said IDE/ATA dataflow control signals during said PIO data-in transfer include read data strobes; said at least one cryptographic interface further comprising at least one cipher engine adapted to transparently perform real time cipher data processing during the PIO data-in transfer between said at least one host device and said at least one data storage device; and said at least one cryptographic interface is configured to process data at least as fast as the at least one host device and the at least one data storage device so as not to impair the overall data transfer efficiency.

* * * * *